United States Patent
Cudak et al.

(10) Patent No.: US 6,253,063 B1
(45) Date of Patent: Jun. 26, 2001

(54) METHOD AND APPARATUS FOR SELECTING A COMMUNICATION DATA RATE BETWEEN MOBILE AND BASE STATIONS

(75) Inventors: Mark C. Cudak, McHenry; Brian K. Classon, Streamwood; Louay A. Jalloul, Palatine; Amitava Ghosh, Vernon Hills; Robert T. Love, Barrington, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/490,606

(22) Filed: Jan. 25, 2000

(51) Int. Cl.[7] ........................................ H04B 1/00
(52) U.S. Cl. ................. 455/63; 455/67.1; 370/468; 370/545
(58) Field of Search .................. 455/63, 67.1, 67.3; 370/468, 538, 540, 543, 544, 545

(56) References Cited

U.S. PATENT DOCUMENTS 5,809,059 * 9/1998 Souissi et al. ..................... 375/202
5,857,147 * 1/1999 Gardner et al. ..................... 455/67.1

OTHER PUBLICATIONS

High Data Rate Technology by Qualcomm, Inc. Mar. 1999, Revision .1.7, Publicly available at www.qualcomm.com.
High Data Rate Overview/Arlink/Architecture dated Oct. 18, 1999, accessed, www.qualcomm.com./hdr.

* cited by examiner

Primary Examiner—Lee Nguyen
(74) Attorney, Agent, or Firm—Sayed Hossain Beladi

(57) ABSTRACT

A mobile station (110) selects an initial data rate for communication between base station (107) and mobile station (110). Mobile station (110) communicates the selected initial data rate to base station (107) through uplink (112). Base station (107) determines a difference level of interference condition experienced by mobile station (107) between a time when the initial data rate was selected by mobile station (110) and a time when base station (107) prepares to communicate to mobile station (110). Base station (107) selects a final data rate for transmission from base station (107) to mobile station (110) based on the determined difference level of interference condition. As such, the initial data rate may be modified to the final data rate while maximizing the down link capacity.

13 Claims, 2 Drawing Sheets

METHOD AND APPARATUS FOR SELECTING A COMMUNICATION DATA RATE BETWEEN MOBILE AND BASE STATIONS

BACKGROUND OF THE INVENTION

The invention relates to the field of communication, and more specifically, to a cellular communication system.

A communication system may employee down link adaptive modulation and coding through a feedback system. An adaptive modulation and coding level of a down link translates as one ordinary skilled in the art know into selection of a data rate of the down link communication. In such a system, a mobile station informs the base station regarding a desired data rate, and the base station complies to the request. When the criteria for selecting a data rate at the mobile station are satisfied, the mobile station determines its desired level of down link communication data rate. This is known as mobile controlled data rate adaptation.

A drawback of a mobile controlled rate adaptation is that the communication system may not achieve high system capacity under time varying loading conditions. The mobile station may not be able to reliably estimate the interference level at proper time to effectuate high usage of the communication system capacity. When selecting the data rate, the mobile is unsure which possible interfering base stations were transmitting idle time slots during the interference measurement, and is unsure which interfering base stations will be idle during the next scheduled transmission from the base station in communication.

Therefore, there is need for a communication system method and apparatus that maximizes the usage of the communication system capacity when a mobile station makes an initial data rate request for a down link transmission from a base station.

DETAIL OF THE PREFERRED EMBODIMENT(S)

Figure 1:
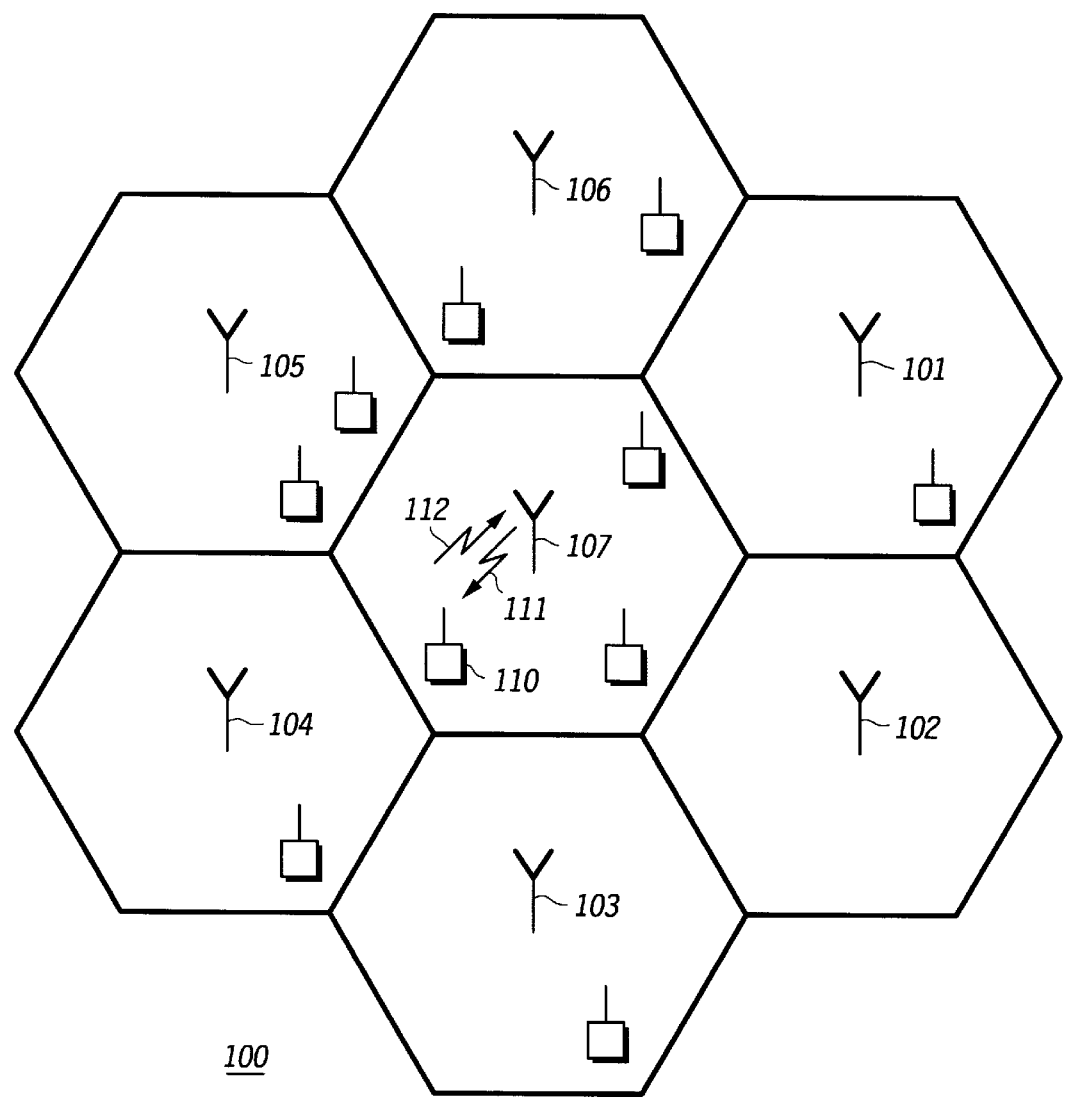
FIG. 1 depicts a communication system utilizing various aspects of the invention.

Referring to FIG. 1, a communication system 100 for communication between a mobile station and a base station is shown. In such a system, there may be more than one mobile station and more than one base station. Moreover, each base station may be sectored to operate independently at least to some extent and for some time. System 100 is shown to have Omni sector cell base station sites 101–107. However, as it will be apparent, various aspects of the invention are also applicable and may be carried out in a system with sectored cell structure. The system 100 shows several mobile stations roaming in the communication system 100 and using communication services offered by base stations 101–107. The communication system 100 also may include several more base stations than shown in FIG. 1. A mobile station communicates to a base station via a communication uplink, such as uplink 112 and via a communication down link, such as down link 111.

According to various aspects of the invention, a mobile station 110 selects an initial data rate for communication between base station 107 and mobile station 110. Mobile station 110 communicates the selected initial data rate to base station 107 through uplink 112. Base station 107 determines a difference level of interference condition experienced by mobile station 107 between a time when the initial data rate was selected by mobile station 110 and a time when base station 107 prepares to communicate to mobile station 110. Base station 107 selects a final data rate for transmission from base station 107 to mobile station 110 based on the determined difference level of interference condition. As such, the initial data rate may be modified to the final data rate while maximizing the down link capacity as one ordinary skilled in the art may appreciate.

The selected initial data rate according to an aspect of the invention is based on a level of carrier to interference (ratio) condition determined by mobile station 110 at the time when the initial data rate was selected by mobile station 110. Moreover, the determined difference level of interference condition is determined by base station 107.

Figure 2:
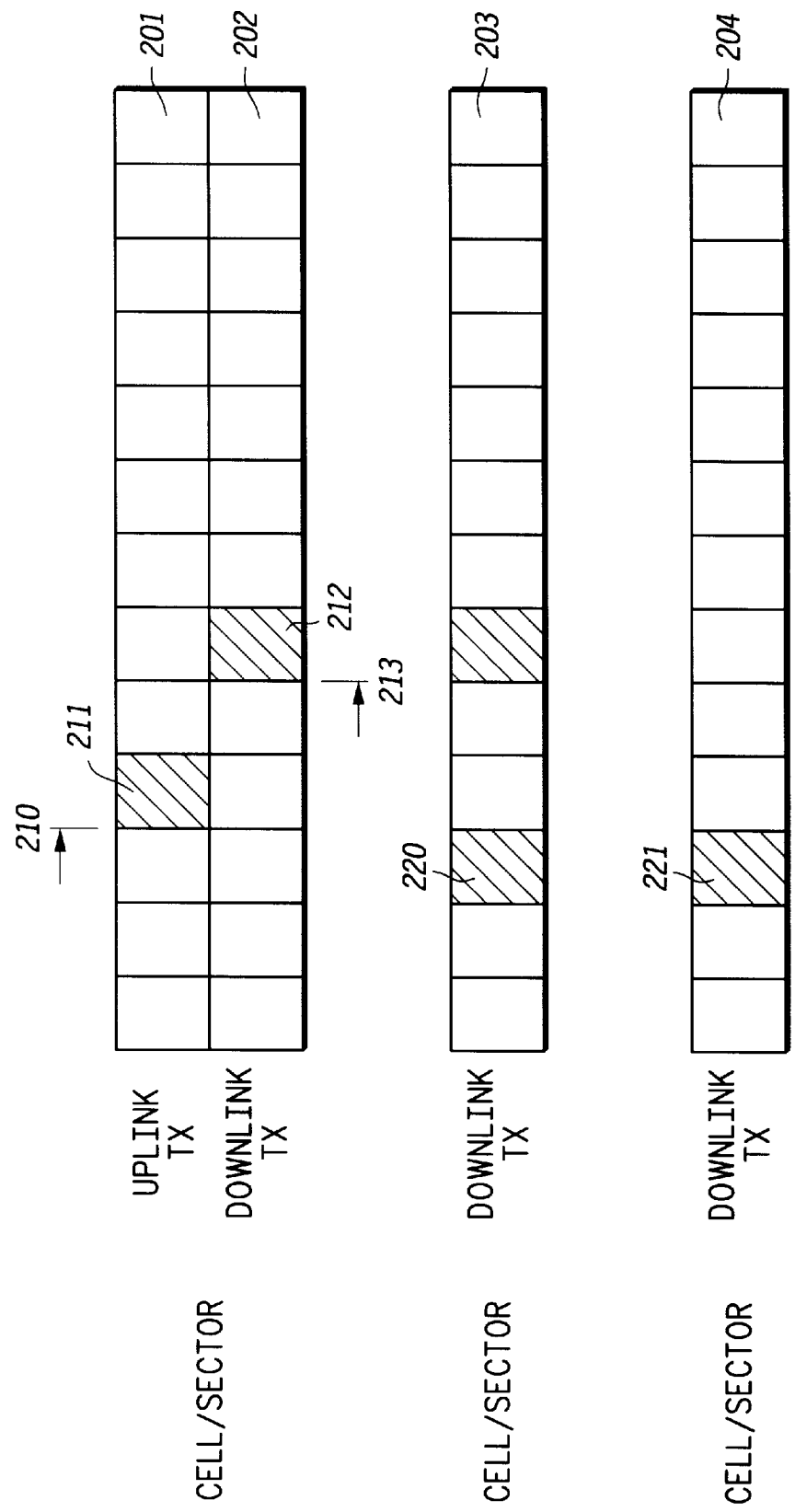
FIG. 2 depicts a communications structure between mobile and base stations.

Various aspects of the invention may be more apparent by making references to FIG. 2 depicting a communication structure between mobile stations and base stations in communication system 100. For example, an uplink 201 transmitted from mobile station 110 after adjusting for propagation delay may appear as shown with respect to a down link 202 transmitted from base station 110. Down link signals 203 and 204 transmitted from other base stations in the surrounding may, for example, appear as shown. Since communication system 100 is a synchronized communication system, time slot structure of all base stations have rough or exact time synchronization. Mobile station 110 may determine the level of interference to carrier ratio at a time 210 while making interference measurement either based on average or instantaneous measurement of interference generated prior to time 210. On a time slot 211, mobile station 110 communicates the selected data rate to base station 107. Base station 107 then transmits on a time slot 212 to the mobile station 110 at the requested data rate. However, the interference condition between time 210 and 213, a time when transmission of time slot 212 begins, may be drastically different. For example, at time 210, down link 203 and 204 are both transmitting, as shown in time slots 220 and 221. As a result, the mobile station after making an interference measurement may decide to select a data rate that is appropriate for such a level of interference. Down link 203 and 204 may be transmitted from other sectors of the base station 110 or other cell sites surrounding base station 107. Note that, for example, at time 213, down link 204 has an idle time slot which provide collectively less interference than time 210. When there is less interference, a higher data rate may be used without severe adverse effect. According to the invention, when base station 107 determines a difference level of interference condition experienced by mobile station 107 between time 210 when the initial data rate was selected by mobile station 110 and time 213 when base station 107 prepares to communicate to mobile station 110 and selecting a final data rate for transmission from base station 107 to mobile station 110 based on the determined difference level of interference condition, the down link capacity of the system is maximized as one ordinary skilled in the art may appreciate.

The selected final data rate may be lower than the selected initial data rate when the determined difference level of interference condition indicates more interference at time 213 when base station 107 prepares to communicate to mobile station 110 than at time 210 when the initial data rate was selected by mobile station 110. Similarly, the final data rate is higher than the selected initial data rate when the determined difference level of interference condition indicates less interference at time 213 when base station 107 prepares to communicate to mobile station 110 than at time 210 when the initial data rate selected by mobile station 110. The selected final data rate is the same as the selected initial data rate when the determined difference level of interference condition indicates approximately same interference at time 213 when base station 107 prepares to communicate to mobile station 110 than at time 210 when the initial data rate selected by the mobile station. Although, the time difference between time 210 and 213 is shown to be two time slots, more or less time difference is also possible depending on the traffic loading condition of the communication system.

According to an aspect of the invention, the selected final data rate is different than the selected initial data rate when the determined difference level of interference condition is higher than a threshold. Such a threshold may be predetermined or adjusted according to system traffic loading condition. Base station 107 accordingly transmits to mobile station 110 at the selected final data rate, preferably during time slot 212 close in time proximity of time 213.

Communication system 100 may be operating according to an embodiment of the invention by transmitting at a predetermined power level known to base stations 101–107. As such, propagation loss of an interfering signal transmitted from a base station and received at the mobile station 110 may be determined. Since the mobile station keeps a table of the pilot signal measurement where the pilot signals are transmitted from different base stations in the area, the propagation loss between the mobile station and each base station in the table is easily determined by subtracting the fixed transmitted power level by what actually measured by the mobile station 110. Such a table may be known to include a list of active base stations, candidate base stations, neighbor base stations or remaining base stations. According to the invention, determining the difference level of interference condition may include receiving from mobile station 110 pilot signal strength measurements made by mobile station 110 of pilot signals transmitted from a plurality of base stations, such as base station 101–106, in a surrounding area of base station 107.

Figure 3:
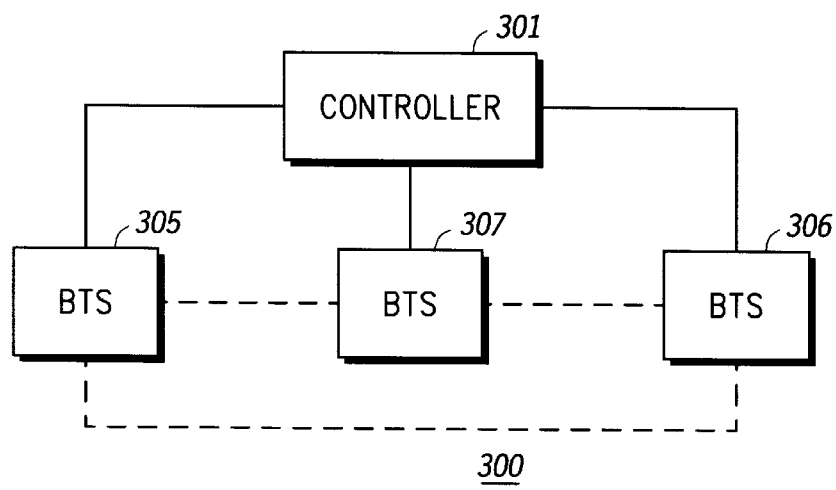
FIG. 3 depicting logical connections between various components of a communication system utilizing various aspects of the invention

Moreover, while referring to FIG. 3 depicting a general and logical connection 300 between base stations, such as base stations 305–307, base station 307 receives from plurality of base stations, 305 and 306, an indication through connections directly to other base stations or through a centralized controller 301, whether any of the plurality base stations in cell sites 101–106 is transmitting at time slot 212 when base station 107 prepares to communicate to mobile station 110. As such, by knowing which base station is transmitting at time slot 212 and which one has been taken into account, base station determines difference level of interference condition.

What is claimed is:

1. In a communication system for communication between a mobile station and a base station, a method comprising the steps of:
   selecting an initial data rate for communication between said base station and said mobile station, wherein said mobile station selects said initial data rate;
   communicating said selected initial data rate from said mobile station to said base station;
   determining a difference level of interference condition experienced by said mobile station between a time when said initial data rate selected by said mobile station and a time when said base station prepares to communicate to said mobile station;
   selecting a final data rate for transmission from said base station to said mobile station based on said determined difference level of interference condition.

2. The method as recited in claim 1 wherein said selected initial data rate is based on a level of carrier to interference condition determined by said mobile station at said time when said initial data rate selected by said mobile station.

3. The method as recited in claim 1 wherein said determined difference level of interference condition is determined by said base station.

4. The method as recited in claim 1 wherein said selected final data rate is lower than said selected initial data rate when said determined difference level of interference condition indicates more interference at said time when said base station prepares to communicate to said mobile station than at said time when said initial data rate selected by said mobile station.

5. The method as recited in claim 1 wherein said selected final data rate is higher than said selected initial data rate when said determined difference level of interference condition indicates less interference at said time when said base station prepares to communicate to said mobile station than at said time when said initial data rate selected by said mobile station.

6. The method as recited in claim 1 wherein said selected final data rate is the same as said selected initial data rate when said determined difference level of interference condition indicates approximately same interference at said time when said base station prepares to communicate to said mobile station than at said time when said initial data rate selected by said mobile station.

7. The method as recited in claim 1 wherein said selected final data rate is different than said selected initial data rate when said determined difference level of interference condition is higher than a threshold.

8. The method as recited in claim 1 further comprising the step of transmitting from said base station to said mobile station at said selected final data rate.

9. The method as recited in claim 8 wherein said transmission is at a predetermined power level.

10. The method as recited in claim 1 wherein said determining said difference level of interference condition including the steps of:
    receiving from said mobile station pilot signal strength measurements made by said mobile station of pilot signals and transmitted from a plurality of base stations in a surrounding area of said base station;
    receiving from said plurality of base stations an indication whether any of said plurality base stations is transmitting at said time when said base station prepares to communicate to said mobile station;
    whereby determining said level of interference condition.

11. A communication system for communication between a mobile station and a base station comprising:

means for selecting an initial data rate for communication between said base station and said mobile station, wherein said mobile station selects said initial data rate;

means for communicating said selected initial data rate from said mobile station to said base station;

means for determining a difference level of interference condition experienced by said mobile station between a time when said initial data rate selected by said mobile station and a time when said base station prepares to communicate to said mobile station;

means for selecting a final data rate for transmission from said base station to said mobile station based on said determined difference level of interference condition.

12. The communication system as recited in claim 11 further comprising means for transmitting from said base station to said mobile station at said selected final data rate.

13. The communication system as recited in claim 11 wherein said means for determining said difference level of interference condition including:

means for receiving from said mobile station pilot signal strength measurements made by said mobile station of pilot signals and transmitted from a plurality of base stations in a surrounding area of said base station;

means for receiving from said plurality of base stations an indication whether any of said plurality base stations is transmitting at said time when said base station prepares to communicate to said mobile station.

* * * * *